United States Patent [19]

Boudart et al.

[11] Patent Number: 4,851,206

[45] Date of Patent: Jul. 25, 1989

[54] METHODS AND COMPOSTIONS INVOLVING HIGH SPECIFIC SURFACE AREA CARBIDES AND NITRIDES

[75] Inventors: Michel Boudart, Stanford; Shigeo T. Oyama, Los Altos; Leo Volpe, Palo Alto, all of Calif.

[73] Assignee: The Board of Trustees of the Leland Stanford Junior University, Stanford University, Stanford, Calif.

[21] Appl. No.: 104,568

[22] Filed: Oct. 5, 1987

Related U.S. Application Data

[63] Continuation of Ser. No. 707,705, Mar. 4, 1985, abandoned, which is a continuation-in-part of Ser. No. 449,809, Dec. 14, 1982, Pat. No. 4,515,763, which is a continuation of Ser. No. 283,587, Jul. 15, 1981, abandoned.

[51] Int. Cl.$^4$ .................. C01B 21/06; C01B 31/34; B01J 27/22; B01J 27/24
[52] U.S. Cl. .................. 423/409; 423/411; 423/440; 502/177; 502/200
[58] Field of Search ............... 423/409, 440, 411, 439, 423/406; 502/177, 174

[56] References Cited

U.S. PATENT DOCUMENTS

| | | | |
|---|---|---|---|
| 3,077,385 | 2/1963 | Robb | 423/440 |
| 3,704,116 | 11/1972 | Paris et al. | 423/409 |
| 4,066,451 | 1/1978 | Rudy | 423/439 |
| 4,115,526 | 9/1978 | Auborn et al. | 423/409 |
| 4,177,230 | 12/1979 | Mazdiyasni | 423/406 |
| 4,196,178 | 4/1980 | Iwai et al. | 423/411 |
| 4,271,041 | 6/1981 | Boudart et al. | 423/415 R |
| 4,287,095 | 9/1981 | Atkinson et al. | 502/177 |
| 4,321,163 | 3/1982 | Wahl et al. | 423/409 |
| 4,325,842 | 4/1982 | Slaugh et al. | 502/177 |
| 4,325,843 | 4/1982 | Slaugh et al. | 502/506 |
| 4,326,992 | 4/1982 | Slaugh et al. | 502/506 |
| 4,384,884 | 5/1983 | Miyake et al. | 423/440 |
| 4,414,182 | 11/1983 | Okamoto et al. | 502/177 |
| 4,460,697 | 7/1984 | Hara et al. | 423/409 |
| 4,515,763 | 5/1985 | Boudart et al. | 423/440 |
| 4,522,708 | 6/1985 | Leclercq et al. | 208/136 |

FOREIGN PATENT DOCUMENTS 2713308  5/1978  Fed. Rep. of Germany ...... 502/177

*Primary Examiner*—Anthony McFarlane
*Attorney, Agent, or Firm*—Richard L. Neeley

[57] ABSTRACT

Methods and compostions produced thereby are provided concerning the preparation and use of high specific surface area carbides and nitrides. The carbides and nitrides can be obtained by thermal reduction of oxides in the presence of a source of carbon and nitrogen respectively, with relatively slow progressive temperature increases prior to completion of the reaction, followed by quenching. Novel metastable carbides can be obtained by carburization of nitrides having high surface area, which nitrides can be prepared by the above-described process.

18 Claims, No Drawings

METHODS AND COMPOSTIONS INVOLVING HIGH SPECIFIC SURFACE AREA CARBIDES AND NITRIDES

BACKGROUND OF THE INVENTION

1. Field of the Invention

Carbides and nitrides of many transition elements provide a great diversity of desirable properties; hardness, conductivity of electricity and heat; catalytic and electrocatalytic activity. In addition, many of the carbides and nitrides are highly refractory, being chemically inert and stable to exceedingly high temperatures. The carbides and nitrides tend to have high melting points so as to be capable of maintaining a solid phase in a wide variety of systems requiring elevated temperatures. Because some of the carbides and nitrides are hard, they are useful for grinding or in conjunction with other materials for grinding.

In many of the applications of carbides and nitrides it is desirable to have a high specific surface area, Sg. This is particularly true where the carbide or nitride serves as a catalyst or is involved in a system requiring a large contact area, as for example the interaction between a gas phase and a solid phase. There exist certain phases of these carbides which are thermodynamically stable only at very high temperatures and are not expected to form at low temperatures. High temperatures cause loss of surface area by sintering. Production of these materials at low temperature would therefore constitute a major advance in materials technology.

2. Description of the Prior Art

Descriptions of conventional carburizing and nitriding processes may be found in Kieffer and Schwarzkopf, Hartstoffe und Hartmetalle, Springer-Verlag, Vienna, 1953; Kieffer and Benesovsky, Encyclopaedia of Chemical Technology, 2nd ed. Vol. 4, p. 70; Vol. 13, p. 814; Wiley (Interscience), New York, 1964; Juza, Nitrides of Metals of the First Transition Series, in Advances in Inorganic Chemistry and Radiochemistry, Vol. 9, Academic Press, New York and London, 1966; Kosolopova, Carbides, Plenum Press, New York, 1971; and Toth, Transition Metal Carbides and Nitrides, Academic Press, New York and London, 1971. References concerned with the production of high surface area catalysts include Böhm and Pohl, Troisiemes Journeer Internat. D'Etude des Piles a Combustible, p. 183, P.A.E., Bruxelles, 1969; Sokolsky et al., Elektrokhimiiya 8:1745 (1972) and Svata and Zabransky, Z. Colln. Czech. Chem. Commun. 39:1015 (1974). Improved processes for enhanced surface area tungsten carbide may be found in Ross and Stonehart, J. Catal. 48:42 (1977) and Mozulewskii et al., Kinetika i Kataliz 18:767 (1977). Imura et al., Preparation of Catalysts II, p. 627, Elsevier Scientific Publishing Co., (1979), describe the preparation of high specific surface area molybdenum oxycarbides.

Face-centered cubic carbides (FCC) $\alpha MoC_{1-x}$ and $\beta WC_{1-x}$ are first described in Clougherty et al., Nature (1961) 191:1194, and in Sara, J. Amer. Ceram. Soc. (1965) 48:251, respectively. The former is described in detail in Rudy et al., Trans. AIME (1967) 239:1247. These Mo and W carbides are thermodynamically stable only above 1650° and 2525° C. They can be obtained by quenching metal-carbon mixtures from these high to low temperatures very rapidly. This technologically awkward method suffers from formation of low-temperature phases as impurities. Methods for producing the carbides and their microhardness are reported by Samsonov et at., Fizika i Khimiia Obrabotki Materialov, 123 (1975) and BakadZakhryapin et al., Fiz. Metal. Metalloved. (1966) 21:782. Superconducting properties are reviewed by Willens et al., Phys. Rev. (1967) 159:327.

SUMMARY OF THE INVENTION

Methods are provided for producing high specific surface area, Sg, carbides and nitrides which find diverse application. One method requires reducing an oxide in a reducing atmosphere at an elevated temperature in the presence of a source of carbon or nitrogen while raising the temperature progressively to completion of the formation of the carbide or nitride and quenching the product after completion. Desirably, the conditions are chosen to avoid formation of surface carbon aggregates during carbide formation.

Novel carbide materials of crystallographic phases normally obtainable only at very high temperatures are prepared by carburization of nitrides at moderate temperatures. These carbides retain the structure, crystallite size and high specific surface area of the nitride parent.

DESCRIPTION OF THE SPECIFIC EMBODIMENTS

High specific surface area carbides and nitrides are produced by either reducing oxides of the desired element in a reducing atmosphere at an elevated temperature in the presence of a source of carbon or nitrogen, respectively, or by carburizing high surface area metal nitrides under relatively mild conditions.

In the oxide reaction, prior to completion of the reaction, temperature increase is controlled at a relatively slow rate, and the rate of reduction monitored. When reduction has substantially slowed or ceased, the product may be optionally maintained at the elevated temperature for a limited period of time, and at the completion of heating is rapidly quenched. The resulting product is a carbide or nitride having substantially higher specific surface area, at least 2-fold and generally greater, than is obtained by conventional techniques, where the elemental metal is contacted with a carbon or nitrogen source at a fixed temperature and the reaction allowed to go to completion. The specific surface area will be at least 40, more usually at least about 75 m$^2$/g, depending on the metal and the non-metallic atom, usually not exceeding about 300 m$^2$/g. The particle size will generally be in the range of about 1 to 15 nm.

A wide variety of elements form stable carbides and/or nitrides. These elements include groups 3b to 7b, 8, 3a, 4a, of the Periodic Table, as well as the lanthanides and actinides, although other elements not included in those groups are also known to form carbides and/or nitrides. (Periodic Table of The Handbook of Chemistry and Physics, 44th ed., Chemical Rubber Publ. Co., 1962, pp. 448–449). Of particular interest are the elements 4b–6b, more particularly 5b–6b, and preferably 6b. Included among the elements of interest are titanium, vanadium, chromium, molybdenum, zirconium, niobium, tantalum, hafnium, rhenium, and tungsten.

The carbides and nitrides of particular interest are those referred to as the interstitial alloys and are frequently characterized by electrical conductivity approaching that of the metals, extreme hardness and high melting points. The nitrides of interest are primarily characterized by being stable at elevated temperatures.

The carbides and nitrides exist in various crystallographic phases, with low and high temperature phases. The following table indicates the metal (System), the composition of low and high temperature phases and the crystal structure, where appropriate. The nitrides in the low temperature phase are convertible by carburization into the high temperature metastable phase carbides.

| System | Phase Low Temperature | Phase High Temperature |
|---|---|---|
| Mo | $\beta$-$Mo_2C$ (hexagonal) | $\alpha$-$MoC_{1-x}$ (>1600° C.) (FCC cubic) |
|  | $\gamma$-$Mo_2N$ (FCC cubic) | $\beta$-$MoN_{1-x}$ (tetragonal) |
| W | WC (hexagonal) | $\beta$-$WC_{1-x}$ (>2500° C.) (FCC cubic) |
|  | $\beta$-$W_2N$ (FCC cubic) | $\gamma$-$W_2N$ (cubic) |
| Cr | $Cr_3C_2$ (orthorhombic) | $Cr_{23}C_6$ (>1300° C.) (FCC complex) |
|  | CrN (FCC cubic) | $\epsilon$-$Cr_2N$ (hcp) |
| V | VC (FCC cubic) | $VC_{1-x}$ (FCC cubic) |
|  | $\delta$-VN (FCC cubic) | $\beta$-$V_2N$ (hexagonal) |
| Nb | NbC (FCC cubic) | $NbC_{1-x}$ (FCC cubic) |
|  | $\delta$-NbN (FCC cubic) | $\gamma$-$NbN_x$ (tetragonal) |
| Ta | TaC (FCC cubic) | $\beta$-$Ta_2C$ (>2180° C.) (hexagonal) |
|  | $\epsilon$-TaN (hexagonal) | $\delta$-TaN (WC hexagonal) |
| Ti | TiC (FCC cubic) | $TiC_{1-x}$ (FCC cubic) |
|  | $Ti_xN$ (FCC cubic) | $\epsilon$-$Ti_2N$ (tetragonal) |
| Zr | ZrC (FCC cubic) | $ZrC_{1-x}$ (FCC cubic) |
|  | $Zr_xN$ (FCC cubic) | ZrN (FCC cubic) |
| Hf | HfC (FCC cubic) | $HfC_{1-x}$ (FCC cubic) |
|  | HfN (FCC cubic) | HfN (FCC cubic) |

Thermostable Carbides and Nitrides

The first group of compounds to be prepared are the thermally stable high surface area metal carbides and nitrides. The method for their preparation employs heating an oxide of the desired element at a temperature below the melting point of the oxide and the sintering temperature of the product and through a temperature range where reduction and reaction with a source of carbon or nitrogen occurs. The heating is done through the range over a predetermined time period and temperature range to reach completion, at which time the product is desirably rapidly quenched, so as to leave a high surface area carbide or nitride product as a powder. The state of oxidation of the oxide of the desired element will vary widely, depending upon the availability of stable oxides, the economic use of hydrogen, the stability of the particular oxide, and its availability as a powder. The oxide will be used as a powder, but may be formed into pellets or slabs. The specific surface area will normally be increased by at least about 2-fold, more usually at least about 5-fold, and preferably at least about 10-fold greater than the specific surface area of the starting material oxide. The powdered oxide can be employed in a fixed bed or fluidized bed, usually a fixed bed. The gas stream may be passed upwardly or downwardly through the bed, depending upon the nature of the bed, the rate of flow, and the size and density of the particles.

The reducing environment will be a hydrogen gas stream containing a source of carbon or nitrogen. Inert gases may be present, but are not necessary. The rate of flow may be varied widely primarily determined by ensuring ample amounts of the gaseous reactants being available and desirably removing the water which is formed as a product. That is, the rate of flow is chosen, so that at all times, at least a sufficient amount of hydrogen is present and at least a stoichiometric amount of carbon or nitrogen is present to provide for the amount required for rapid reaction during the interval in which the gas is in contact with the solid phase as well as providing a sweeping away of the water vapor. While the flow rate is not critical to this invention, except as described above, convenient space velocities based on bed volume have been in the range of about 500 to about 50,000 $h^{-1}$. The mole ratio of hydrogen to carbon or nitrogen source may be varied widely, so long as the above indicated amounts are continuously present. When carbiding, the mole ratio of hydrogen to carbon source will generally be greater than about 2 to 1 and may be as high as about 10 to 1, more usually being about 2–8:1, frequently about 3–6:1. Desirably when carbiding, the mole ratio of hydrogen and carbon source is at about the equilibrium ratio at the highest temperature used for the carburization to avoid the formation of graphitic or amorphous carbon.

As indicated, the carbon source will normally be a hydrocarbon, particularly methane, but can be other carbon compounds, such as carbon monoxide, which will react with the oxide under reducing conditions to form a carbide. While hydrocarbons higher than methane may be employed, they will frequently be more susceptible to form surface carbon aggregates, which will be particularly undesirable when preparing a catalytic material. In other situations, where either carbon would not be of concern or its presence may be of interest, higher hydrocarbons could be desirable.

Nitrogen hydrides can conveniently be used for nitriding, although for economy and efficiency, ammonia will normally be used. The mole ratio of hydrogen to nitrogen source may be varied widely. Unlike the carbon source, the nitrogen source does not cause formation of non-metal surface aggregates and, thus, generally a lower mole ratio of hydrogen to nitrogen source may be used. This ratio can be as low as zero.

Besides the hydrogen, carbon source and nitrogen source, inert gases may also be used up to about 80 volume percent, preferably below about 60 volume percent and may be entirely excluded.

The reaction is carried out by placing the powder in an appropriate reaction zone and passing the mixed gas through the powder. The oxide powders will generally have Sg in the range of 0.01 $m^2/g$ to 20 $m^2/g$; for $MoO_3$ 0.1 $m^2/g$ to 15 $m^2/g$ for $WO_3$ 0.1 $m^2/g$ to 10 $m^2/g$.

The temperature may be raised at a reasonably rapid rate up to prior to significant reduction and formation of the carbide or nitride. At least about 25° C. prior to completion, usually at least about 100° C. prior to completion, more usually at least about 50° C. and preferably at least about 150° C. prior to completion the temperature increase will be slowed, so that the reaction requires at least about 20 minutes for completion, preferably at least about 30 minutes for completion. Completion is evidenced by a substantial constant gas effluent with the substantial absence of water.

The rate of increase may be linear or nonlinear, but should at least be reasonably uniform. On the average, during the slow period of temperature increase, the temperature increase should vary from about 0.1° to 5° C./minute, more usually from about 0.25° to 5° C./minute, generally from about 0.25° to 4.5° C./minute, preferably from about 0.5° to 4° C./minute.

The temperature is continuously raised during the slow period until completion of reaction. While the completion may be determined in a variety of ways, one can monitor the gas effluent and by monitoring its composition as to mole ratios, hydrogen content, water, or the like, determine when there is no further reaction. At this time, heating may be promptly stopped and the reaction quenched so that there is no further reaction occurring. While preferably the reaction is rapidly quenched shortly prior to completion or at completion (as indicated by the gas stream effluent) the temperature may be maintained for a limited period of time, usually the lesser of one hour or fifty percent of the time for the reaction to go to completion, usually less than about twenty-five percent of the time for the reaction to go to completion (as indicated by monitoring the effluent). The time for the reaction will begin with the formation of water and end with the substantial absence of water in the effluent and absence of oxygen in the product. Generally, no substantial advantages are observed by maintaining the temperature after the effluent composition remains substantially constant. After quenching the reaction, the resulting powder may then be isolated as a fine powder having substantially enhanced specific surface area.

The subject invention finds particular application in the preparation of catalytic materials. In the case of catalytic materials, passivation is sometimes required. Passivation requires that the catalytic material be exposed to a small amount of an oxidizing agent, normally oxygen, to provide for a thin stable oxide coating over the catalyst. Passivation techniques are well known and need not be exemplified here.

Thermodynamically Metastable Carbides

In preparing the metastable carbides, usually face-centered cubic, FCC, carbide phases, the nitrides having high surface area prepared as above may be employed. Thus, although in principle the nitride parent can have any value of Sg, generally, the nitrides will have surface areas of from 10 to 250 m²/g, for tungsten nitride 10 to 100 m²/g, and for molybdenumn nitride 15 to 250 m²/g. While the same procedure as described above for carburizing the nitrides may be employed, the slow heating is not required. In view of the high sintering temperatures of the carbides and nitrides and the fact that relatively low carburizing temperatures can be employed to avoid sintering, the nitrides may be rapidly heated to the carburizing temperature in the presence or absence of a carbon source and then maintained at the carburizing temperature or the temperature raised at a convenient rate, while maintaining a carburizing atmosphere. Therefore, the heating can be carried out quite rapidly, employing temperatures in the range of about 500°–1500° C., preferably in the range of about 650°–900° C. Conveniently, the carbide can be prepared in a single process by first preparing the nitride and at completion of the nitride reaction, changing the inlet gas from a nitrogen source to a carbon source.

The nitride-to-carbide transformation belongs to the class of topotactic reactions because of the crystal lattice relationship between the parent and the product throughout the bulk of the solid. H. R. Oswald and J. R. Günter, in "1976 Crystal Growth and Materials," (E. Kaldrs and H. J. Scheel, Eds.), North Holland: Amsterdam, 1977, p. 415. Usually topotaxy preserves only certain structural motives, but here the carbides take over the crystal lattice of the nitrides entirely. A topotactic process starts with oriented nucleation of the product phase relative to the parent crystal. Therefore, the subject case, which requires no rearrangement of the metal atoms, provides an ideal example of topotaxy. As a typical topotactic reaction, this process is characterized by restricted mobility of species in the solid and leads, ultimately, to metastable products unattainable by common preparation methods.

The metastable metal carbides will generally have a specific surface area in the range of 5 to 300 m²/g, more usually 30 to 250 m²/g. Face-centered molybdenum carbide will generally have a specific surface area from 15 to 250, more usually from 100 to 200 m²/g, while the face-centered cubic tungsten carbide will generally have a surface area of from 10 to 100, more usually from 40 to 80 m²/g.

In some instances, it is observed that free carbon is produced which can clog the pores of the metal carbide. This may be readily removed by hydrogen treatment at elevated temperatures, in the range of about 500°–900° C. with a continuous stream of hydrogen, monitoring hydrocarbons in the effluent until no further hydrocarbons are observed. Alternatively, hydrogen may be included in the gas phase during carburization in from 25 to 90 volume percent to reduce carbon formation. It is found that the hydrogen treatment does not affect the structure and crystallite size of the metastable phases.

The time for the reaction may be as short as 5 min, and will usually not exceed 24 hr, more usually not exceeding 12 hr, preferably not exceeding 6 hr, depending upon the reaction, the temperature, the amount of reactant, and the like.

The particles which find use as catalysts as well as for other applications will generally be of a size in the range of 1 to 10 nm diameter, usually 2 to 6 nm diameter, more usually 3 to 5 nm diameter on the average, being relatively uniform in size.

The following examples are offered by way of illustration and not by way of limitation.

EXAMPLES

Thermostable Molybdenum Carbide ($Mo_2C$)

The apparatus employed consisted essentially of a modified Perkin-Elmer Model 212C sorptometer. The gas flow controllers allow the mixing of gases, for example hydrogen, argon and methane. The gas mixture passes through the reference side of a thermal conductivity detector, after which it is lead through stainless steel and glass fittings to a quartz cell containing the sample. The gaseous effluent passes through an activated silicon dioxide trap which removes water from the gaseous stream and the dried stream then passed through the sample side of the thermal conductivity cell. The thermal conductivity detector monitors the extent of reduction by detecting changes in hydrogen concentration. Where no hydrogen is consumed the signal is zero. The flow rate of the gas is measured at the exit of the detector with a bubble flow meter.

The quartz cell reactor is a modified U-tube with the sample at the bottom of the sample U-tube, which is inside a Hoskins Electric Furnace (Model FA120). The temperature is measured by a thermocouple clamped on the outside of the tube next to the sample. The furnace temperature is controlled by a Thermac controller (Research Incorporated Control), with a controller monitored by Data Trak programmer also from the same supplier. The output from the thermal conductivity detector is recorded on a chart recorder.

In order to demonstrate the subject invention, the following experiments were carried out. In the experiment 1.3401 g $MoO_3$ was used.

The flow rates in cc/min were $H_2$, 202; $CH_4$, 47.

| | Time/Temp. profile | |
|---|---|---|
| Time (min) | Temp °K. | Flow rate cc/min |
| 0 | 768 | 235 |
| 10 | 789 | 236 |
| 20 | 805 | 233 |
| 40 | 834 | 232 |
| 51 | 850 | 229 |
| 59 | 863 | 221 |
| 62 | 868 | 209 |
| 63 | 870 | 215 |
| 64 | 871 | 224 |
| 65 | 872 | 228 |
| 70 | 880 | 229 |
| 91 | 923 | 226 |
| 101 | 938 | 226 |
| 118 | 961 | 236 |
| 130 | 976 | 237 |
| 140 | 994 | 230 |
| 145 | 1000 | 231 |
| 147 | terminate | |

The following table compares the chemisorption properties of the molybdenum carbide catalyst prepared as described above and a conventional molybdenum catalyst. The tests employed for determining the properties are conventional.

| Catalyst | CO uptake $\mu mol/g$ | BET Specific Surface Area (Sg) $m^2/g$ | Density of Surface Metal Atoms $10^{14}$ cm$^{-2}$ |
|---|---|---|---|
| Invention | 262 | 51.0 | 3.1 |
| Conventional | 37 | 12.5 | 1.8 |

It is evident from the above results, by employing the subject invention, carbides can be obtained having greatly enhanced specific surface area as well as improved catalytic properties.

Thermostable Molybdenum Nitride ($Mo_2N$)

In the next experiment molybdenum nitride was prepared. About 1 g of high purity $MoO_3$ powder was loaded into a quartz microreactor as a packed bed supported on a porous quartz frit and placed in the center of a furnace controlled by a temperature programmer. The local temperature was measured by a chromel-alumel thermocouple. Anhydrous ammonia at atmospheric pressure was passed through the reactor at 100 cc (NTP)/min from the top. The sample was rapidly heated to 417° C., followed by a linear temperature increase between 417° and 467° C. at a rate of 0.01° C./sec, a temperature increase from 467° to 697° C. at a linear rate of 0.05° C./sec, followed by maintaining the sample at 697° C. for 0.5 hr. The entire process took under four hours. The product had the following properties. BET specific surface area of 188 $m^2/g$, and CO uptake of 1280 $\mu mol/g$.

The product was passivated by flowing 1%/$O_2$/He over the sample product, which reduced the BET specific surface area to 163 $m^2/g$.

The activity in the ammonia synthesis of $Mo_2C$ prepared in a temperature programmed manner is reported over the table below. The activity is compared to that of a ruthenium catalyst and a doubly promoted iron catalyst, resembling the commercial iron catalyst. The comparison is important since ruthenium and iron are considered to be the most active metals for the synthesis. The rate measurements were carried out in an integral flow reactor at atmospheric pressure with a stoichiometric $H_2$—$N_2$ feedstream. The activity is reported as a site time yield, Y, defined as the average number of ammonia molecules produced per surface metal atom in the catalytic bed. It is obtained from experimental quantities by $$Y = \frac{uy}{\overline{v}wA}$$

where u is the flow rate of synthesis gas leaving the reactor in cm$^3$s$^{-1}$ measured at ambient conditions, y is the mole fraction of $NH_3$ in the gas mixture leaving the reactor, $\overline{v}$ is the molar volume of an ideal gas at the conditions of u measurement, w is the weight of catalyst in the reactor and A is the number of metallic surface atoms per unit catalyst weight. The latter number is obtained by standard chemisorption of CO at Dry-Ice-/acetone bath temperature, and in the case of ruthenium by the chemisorption of $H_2$ at room temperature.

Because the ammonia synthesis reaction is limited by equilibrium, the site time yield is best expressed as a function of both temperature and distance from equilibrium. A measure of the latter quantity is the efficiency, $\eta$, defined as the mole fraction of ammonia leaving the reactor normalized by the equilibrium mole fraction at reactor conditions.

| | Steady-State Activity of Catalysts in Ammonia Synthesis at 400° C. | |
|---|---|---|
| Catalyst | Efficiency $\eta$ | Site Time Yield $Y/10^{-3}$ s$^{-1}$ |
| $Mo_2C$ | .10 | 2.6 |
| 5% Ru/$Al_2O_3$ | .10 | .83 |
| $Mo_2C$ | .40 | .73 |
| Fe—$K_2O$—$Al_2O_3$ | .40 | 14.0 |

As can be seen, the activity of the molybdenum carbide is in between that of the ruthenium and iron catalysts.

Metastable Carbides of Molybdenum and Tungsten

The powders of $\alpha MoC_{1-x}$ and $\beta WC_{1-x}$ were prepared at atmospheric pressure by downflow of reactive gases through packed beds of $W_2N$ or $Mo_2N$ prepared as described above. The gases were $CH_4$ or $H_2$ or both. The nitride parents had been synthesized by reacting $WO_3$ (99.999%) or $MoO_3$ (99.998%) powders with $NH_3$. The experiments employed about 0.5 g of solid precursor. The nitrides were carburized in the same quartz reactor in which they had been produced, without intermediate exposure to air.

Presence of gas products at the reactor exit was determined qualitatively with a gas chromatograph. Alternatively, the gas stream was analyzed for $NH_3$ with an NDIR spectrophotometer. The rate of $CH_4$ flow was measured with a rotameter, and the total flow rate was determined at the reactor exit with a soap-film flow meter. The latter flow rate was on the order of $10^2$ $\mu mol s^{-1}$ and held constant.

The flow reactor was a part of a cell designed to measure in situ adsorption on the solid. Gas adsorption experiments were performed in a highly precise volumetric adsorption system. Before exposure to air, all samples were passivated with a flowing mixture of 1% $O_2$ in He.

The bulk structure of the materials was determined by the standard powder X-ray diffractometric technique. This included crystallite-size estimation from X-ray diffraction (XRD) line broadening.

Syntheses of the carbides $\beta WC_{1-x}$ and $\alpha MoC_{1-x}$ were accomplished by temperature-programmed reactions.

The reactants were high-$S_g$ $W_2N$ and $Mo_2N$, as well as a sample of $Mo_2N$ with small $S_g$, designated as $Mo_2N$—S.

TABLE 1
Properties of tungsten and molybdenum nitrides before carburization.

| Sample | $a_{cub}$/pm[a] | $S_g$/m$^2$g$^{-1}$ | CO uptake/ $\mu$mol g$^{-1}$ | $d_c$/nm[c] |
|---|---|---|---|---|
| $\beta W_2N$ | 412 ± 1 | 76[b] | 180 | 4 |
| $\gamma Mo_2N$ | 416 ± 1 | 190[b] | 970 | 6 |
| $\gamma Mo_2N$—S | 416 | 20 | — | 20 |

[a]Lattice parameter of the FCC phases determined by XRD.
[b]Measured following CO adsorption and evacuation at room temperature. Carbon monoxide irreversibly chemisorbed at room temperature decreases the $S_g$ of the nitrides by more than 10%.
[c]Crystallite size.

Methane treatment of the tungsten nitride below 577° C. or of molybdenum nitride below 397° C. did not lead to any observable reaction. Above these temperatures, $H_2$, $N_2$, and $NH_3$ were detected at the reactor exit. As the temperature slowly increased, so did the amounts of these three gases. Their concentrations went through broad maxima around 797° and 527° C. for the tungsten and molybdenum compounds, respectively. At the final temperatures of 877° and 697° C., no $N_2$ or $NH_3$ could be detected anymore, and the $H_2$ content had sharply fallen.

Aqua regia and hot concentrated $HNO_3$ solution are known to dissolve the carbides completely. The products of the reactions, however, left free carbon as a residue in both solutions. Therefore, bulk free carbon was another product of the reactions.

Both transformations to carbide were accompanied by large decreases in $S_g$. This is shown in Table 2, together with other properties of the fresh products.

TABLE 2
Crystal properties and $S_g$ values of the FCC carbides prepared by carburization of W and Mo nitrides.

| Sample | $a_{cub}$/pm | $d_c$/nm | $S_g$/m$^2$g$^{-1}$ after $CH_4$ treatment | $S_g$/m$^2$g$^{-1}$ $CH_4$ and $H_2$ treatments |
|---|---|---|---|---|
| $\beta WC_{1-x}$ | 418 ± 1[a] | 4 | 30 | 55 |
| $\alpha MoC$ | 423 ± 1 | 6 | 150 | 185 |
| $\alpha MoC_{1-x}$—S | 423 | 20 | — | 20 |

[a]Following $H_2$ treatment. After initial carburization with $CH_4$, the parameter was 6 pm higher.

Hydrogen was passed at 727° and 597° C. through the beds of the $\beta WC_{1-x}$ and $\alpha MoC_{1-x}$ samples, respectively to remove bulk free carbon. Methane appeared at the reactor exit; its concentration increased and reached a maximum value in approximately 2 hr, at which point the reactor was quenched to room temperature. The $H_2$ treatment did not alter the structure and crystallite size of the FCC phases, and no new phases appeared in the XRD patterns. The only effect was a 6 pm decrease in the lattice parameter of $\beta WC_{1-x}$ to 418±1 pm. The tungsten carbide sample contained free carbon as it did before the $H_2$ treatment, but no free carbon could be detected in its molybdenum counterpart.

The reaction with $H_2$ restored much of the $S_g$ lost during the nitride's carburization (Table 2). The amount of CO chemisorption was found by extrapolating the isotherms to zero pressure. The fraction of CO that could not be evacuated at room temperature is chemisorbed irreversibly at that temperature. The data are presented in Table 3. Note that the fresh carbide samples prior to $H_2$ treatment were not able to chemisorb CO.

TABLE 3
Selective Chemisorption on the Carbide Powders of W and Mo.[a]

| Sample | chemisorption/ $\mu$mol g$^{-1}$ CO | H$_2$ | $n_{CO}$/10$^{14}$ cm$^{-2}$ | $n_{H_2}$/10$^{14}$ cm$^{-2}$ |
|---|---|---|---|---|
| $\beta WC$ | 137 | 98 | 1.51 | 1.08 |
| $\alpha MoC_{1-x}$ | 950 | — | 3.09 | — |
| $\alpha MoC_{1-x}$—S | 178 | — | 5.26 | — |

[a]The table gives the amounts of total and irreversible chemisorption for tungsten and molybdenum carbides, respectively.

In a separate experiment, an identical $Mo_2N$ sample was carburized following the temperature-time program indicated above with a 1:4 $CH_4$—$H_2$ mixture, rather than with $CH_4$ alone. The XRD pattern, $S_g$, and CO uptake of the final product were similar to those of the $\alpha MoC_{1-x}$ sample prepared by sequential carburization with $CH_4$ and isothermal $H_2$ treatment. No free carbon was found in the reactor after the synthesis.

Another carburization experiment was done with a sintered $Mo_2N$ sample. The sintering involved heating the high-$S_g$ $Mo_2N$ powder at 797° C. in flowing $N_2$ for 12 hr. The sintered nitride, $Mo_2N$—S, had an $S_g$ of 20 m$^2$/g and crystallite size of ca. 20 nm. This sample, too, was reacted with a 1:4 $CH_4$—$H_2$ mixture in the same way as the high $S_g$ powder. The treatment produced a carbide, $\alpha MoC_{1-x}$—S, having an FCC lattice with the same parameter, $a_{cub}$=423 pm, as the high-$S_g$ product. The values of $S_g$ and crystallite size were equal to those of its parent $Mo_2N$—S (Table 2). The amount of CO chemisorption is given in Table 3. Again, free carbon was absent after the synthesis. Indeed, the product dissolved in aqua regia without a residue.

The results show that no sintering takes place as a result of the diffusion of interstitial N and C atoms through the solid. Indeed, the nitride-to-carbide transformation does not change the crystallite size. The $S_g$ values of the $Mo_2N$ samples, both the original and the sintered ones, are retained in the case of $CH_4$—$H_2$ treatment. With $CH_4$ alone, the $S_g$ of $W_2N$ and $Mo_2N$ decrease due to clogging of the pores with free carbon, rather than to sintering. This is why "recovery" of $S_g$ takes place during the subsequent carbon hydrogenation.

The results on gas chemisorption (Table 3) provide a preliminary indication of the surface reactivity of the carbides. The number densities, $n_{CO}$ and $n_{H2}$, for molecules chemisorbed at room temperature are calculated as the uptake per unit BET $S_g$. The density of the metal atoms on a clean carbide surface, $n_W$ or $n_{Mo}$ should be $1.1 \times 10^{15}$cm$^{-2}$, assuming that the surface consists of equal proportions of the low index planes. On $\beta WC_{1-x'}$, $n_{CO}$ and $n_{H2}$ correspond to 14 and 11% of $n_W$. On $\alpha MoC_{1-x}$ and $\alpha MoC_{1-x}$—S the values of $n_{CO}$ are close to 30 and 50% of $n_{Mo}$, respectively.

The subject $n_{CO}$ and $n_{H2}$ values are higher than any reported previously for reduced carbide powders of tungsten or molybdenum.

It is evident from the above results, that the subject invention provides new, useful and efficient ways for greatly enhancing the specific surface area of a wide variety of carbides and nitrides. By virtue of this invention, more effective catalysts can be produced, as well as novel supports, abrading materials, and the like. The enhanced surface area provides for enhanced catalytic activity as well as a wide variety of other desirable physical characteristics.

Although the foregoing invention has been described in some detail by way of illustration and example for purposes of clarity of understanding, it will be obvious that certain changes and modifications may be practiced within the scope of the appended claims.

What is claimed is:

1. A high specific surface area metal carbide or nitride, wherein said metal is molybdenum, tungsten, titanium, chromium, zirconium, niobium, vanadium, tantalum, hafnium, or rhenium, said carbides and nitrides being prepared from the respective metal oxides and resulting in at least a 5-fold increase in surface area over that of said oxide, produced by a method which comprises:
   heating said oxide substantially uniformly and continuously at a rate in the range of 0.1° to 5° C./min for at least 20 minutes in the presence of a reducing environment and a source of carbon or nitrogen from a temperature at least 25° C. prior to substantial completion of formation of said carbide or nitride, and through a temperature range wherein reduction of said oxide and reaction with carbon or nitrogen of said source occurs to form a carbide or nitride reaction product, respectively, whereby an effluent is formed comprising an unreacted portion of said source and gases resulting from reaction of said source with said oxide, and wherein said heating continues to a final temperature until said reaction is substantially complete as evidenced by the substantial absence of change in the composition of said effluent;
   lowering the temperature of the reaction product by at least 25° C. by stopping the heating after reaching the final temperature or after maintaining the final temperature for the lesser of about one hour or about 50 percent of the time of said heating; and
   wherein said carbide or nitride is characterized by a particle of a size in the range of about 1 to 15 nm and having a specific surface area of at least about 40 m$^2$/g when measured by BET method.

2. A metal carbide or nitride according to claim 1, wherein said metal is molybdenum.

3. A metal carbide or nitride according to claim 1, wherein the metal is tungsten.

4. A metal carbide or nitride according to claim 1, wherein said metal is vanadium.

5. A metal carbide according to claim 1, wherein said metal is molybdenum.

6. A metal nitride according to claim 1, wherein said metal is molybdenum.

7. A metal carbide according to claim 1, wherein said metal is tungsten.

8. A metal nitride according to claim 1, wherein said metal is tungsten.

9. A method for preparing a thermodynamically metastable metal carbide, wherein said metal is molybdenum, vanadium, tungsten, titanium, chromium, zirconium, niobium, tantalum, hafnium, rhenium, said method comprising:
   heating a nitride having a particle size in the range of about 1 to 15 nm and a specific surface area of at least about 40 m$^2$/g when measured by BET method in the presence of a carbon source at a temperature in the range of about 500°–1500° C. for a sufficient time to substantially displace all of the nitrogen with carbon, wherein a thermodynamically metastable carbide is formed; and
   isolating said thermodynamically metastable carbide having substantially the same crystal structure as said nitride.

10. A method according to claim 9, wherein said nitride is prepared from an oxide of said metal according to a method which comprises:
   heating said oxide substantially uniformly and continuously at a rate in the range of about 0.1° to 5° C./min for at least 20 minutes in the presence of a reducing environment and a source of nitrogen from a temperature at least 25° C. prior to substantial completion of formation of said nitride, and through a temperature range wherein reduction of said oxide and reaction with nitrogen of said source occurs to form a nitride, whereby an effluent is formed comprising an unreacted portion of said source and gases resulting from reaction of said source with said oxide, and wherein said heating continues to a final temperature until said reaction is substantially complete as evidenced by the substantial absence of change in the composition of said effluent; and
   lowering the temperature of the nitride by at least 25° C. by stopping the heating after reaching the final temperature or after maintaining the final temperature for the lesser of about 1 hour or about 50% of the time of said heating.

11. A method according to claim 9, comprising the additional step of mixing hydrogen with said carbon source or treating the resulting metastable cubic carbide with hydrogen to remove any free carbon.

12. A method according to claim 9, wherein said metal is molybdenum.

13. A method according to claim 9, wherein said metal is tungsten.

14. A catalyst consisting essentially of a face-centered cubic molybdenum or tungsten carbide having crystals of a mean diameter in the range of about 1-15 nm, and having a specific surface area of at least 40 m$^2$/g when measured by BET method.

15. The catalyst of claim 14, wherein said carbide is molybdenum carbide.

16. The catalyst of claim 14, wherein said carbide is tungsten carbide.

17. A high specific surface area metal carbide or nitride, wherein said metal is molybdenum, tungsten, titanium, chromium, zirconium, niobium, vanadium, tantalum, hafnium, or rhenium, said carbides and nitrides being prepared from the respective metal oxides and resulting in at least a 5-fold increase in surface area over that of said oxide, produced by a method which comprises:

heating said oxide uniformly and continuously at a rate in the range of about 0.1° to 5° C./min for at least 20 minutes in the presence of a reducing environment and a source of carbon or nitrogen from a temperature at least 25° C. prior to completion of formation of said carbide or nitride, and through a temperature range wherein reduction of said oxide and reaction with carbon and nitrogen of said source occurs to form a carbide or nitride reaction product, respectively, whereby an effluent is formed comprising an excess unreacted portion of said source and gases resulting from reaction of said source with said oxide, and wherein said heating continues to a final temperature until said reaction is complete as evidence by the absence of change in the composition of said effluent;

lowering the temperature of the reaction product by a least 25° C. by stopping the heating after reaching the final temperature or after maintaining the final temperature for the lesser of about one hour or about 50% of the time of said heating; and wherein said carbide or nitride is further characterized by a particle of a size in the range of about 1 to 15 nm and having a specific surface area of at least about 40 m$^2$/g when measured by BET method.

18. A method for preparing a thermodynamically metastable metal carbide, wherein said metal is molybdenum, vanadium, tungsten, titanium, chromium, zirconium, niobium, tantalum, hafnium or rhenium, said method comprising:

heating a nitride having a particle size in the range of about 1 to 15 nm and specific surface area of at least about 40 m$^2$/g when measured by BET method, in the presence of a carbon source at a temperature range of about 500°–1500° C. for a sufficient time to substantially displace all of the nitrogen with carbon, wherein a thermodynamically metastable carbide is formed; and isolating said thermodynamically metastable carbide having substantially the same crystal structure as said nitride.

* * * * *